| United States Patent [19] | [11] Patent Number: 4,981,916 |
|---|---|
| Willis | [45] Date of Patent: Jan. 1, 1991 |

[54] HYDROESTERIFICATION OF POLYMERIZED CONJUGATED DIENES

[75] Inventor: Carl L. Willis, Houston, Tex.

[73] Assignee: Shell Oil Company, Houston, Tex.

[21] Appl. No.: 357,451

[22] Filed: May 26, 1989

[51] Int. Cl.$^5$ ................................................ C08F 8/00
[52] U.S. Cl. .............................. 525/332.8; 525/332.9; 525/333.1; 525/333.2; 525/370; 525/383; 525/384
[58] Field of Search ............... 525/332.8, 332.9, 333.1, 525/333.2

[56] References Cited

U.S. PATENT DOCUMENTS 3,539,654 11/1970 Pautrat et al. .................. 260/768
3,776,981 12/1973 Winkler et al. ................ 260/880 B

FOREIGN PATENT DOCUMENTS

| 882369 | 4/1989 | Australia . |
| 0106379 | 8/1983 | European Pat. Off. . |
| 0148592 | 12/1984 | European Pat. Off. . |
| 0227160 | 12/1986 | European Pat. Off. . |
| 313150 | 4/1989 | European Pat. Off. . |
| 1132602 | 5/1989 | Japan . |
| 1378185 | 2/1972 | United Kingdom . |

Primary Examiner—Bernard Lipman

[57] ABSTRACT

Polymerized 1,3-butadiene, including styrenic block copolymers, are functionalized with both carboxylic ester groups and ketone linking groups by reaction with carbon monoxide and an alcohol. Such conjugated diene polymers can be reacted in the presence of a catalyst composition that includes a cobalt compound and an amine ligand. The functionalized 1,3-butadiene polymers may be hydrogenated with a nickel/aluminum catalyst which removes olefinically unsaturated carbon-carbon bonds without substantially hydrogenating the ketone linking groups and carboxylic ester groups.

13 Claims, No Drawings

HYDROESTERIFICATION OF POLYMERIZED CONJUGATED DIENES

BACKGROUND OF THE INVENTION

The invention relates to functionalized 1,3-butadiene polymers and copolymers, and to specific processes for making functionalized conjugated diene polymers.

The production of hydroxyl and carbonyl compounds by reacting olefins with carbon monoxide and hydrogen is known. The products contain, as a rule, one more carbon atom than the reacting olefin. The reaction requires a hydrocarbon-soluble catalyst, usually one containing cobalt, iron, nickel or rhodium atoms, i.e., metals selected from Group 8 of the Periodic Table of the Elements, in complex bond with at least one ligand consisting of a carbon monoxide molecule and often a second ligand containing an organic compound of an atom, such as phosphorus or arsenic, selected from Group 5a of the Periodic Table.

U.S. Pat. No. 3,776,981 and equivalent British patent specification No. 1,378,185 describe a process for preparing a hydroxylated block copolymer by reacting, with carbon monoxide and hydrogen, an unsaturated block copolymer having at least one polymer block of a monoalkenylarene and at least one polymer block of a conjugated diene wherein the polymer block of the conjugated diene has a 1,2 or 3,4 microstructure content of between 0% and 30% and a 1,4 microstructure content of between 100% and 70%, the reaction with carbon monoxide and hydrogen being continued until substantially all of the unsaturation of the conjugated diene block(s) is removed, 10–100% thereof being replaced by hydroxymethyl groups and 90–0% thereof being replaced by hydrogen atoms. This known process may be carried out as a one-step process, but then relatively high hydrogen pressures are required.

European Patent Application Publication No. 148592 describes the preparation of carboxylic acid or ester derivatives of polymeric compounds containing residual unsaturation. The polymers are reacted with carbon monoxide and an alcohol in the presence of a protonic acid, a Group 8 metal or Group 8 metal compound, and a copper compound. The application presents data for functionalization of polyisobutylene which has a single unsaturated carbon-carbon bond per molecule. The functionalization of other unsaturated polymers by the same process is suggested although not specifically described.

U.S. Pat. No. 3,539,654 describes the modification of styrenic block copolymers with carbon monoxide and an acid in the presence a metal halide catalyst. The resulting polymer was reported to have a significant gel content and to contain ester and aldehyde functionality before treatment with alcohol potash and with copper ions and water. This patent also describes the non-catalysed reaction of a random structured polybutadiene with carbon monoxide in water followed by reaction with ethanol resulting in a polymer that reportedly contains ether bonds or carboxylate groups.

Conversion of conjugated diene monomers into a polydiene block occurs in several ways using the lithium based catalysts, preferably lithium alkyls, employed according to the prior art. Polymerization of butadiene leads to a mixture of several types of polymer microstructures, known as cis-1,4, trans-1,4 and 1,2 microstructures. In the cis-1,4 and trans-1,4 structures, carbon arrangement is all in a line and no small side chains are formed; thus, the double bonds produced are internal in the backbone chain. In the 1,2 microstructure, a two-carbon vinyl group is present as a short side chain directly attached to the two remaining carbon atoms of the original diene monomer unit. All three types of microstructure may be present in a polydiene block, but process conditions are known in the art to maximize or minimize any of the three types of microstructures if so desired.

A fourth type of microstructure known as 3,4 microstructure is also formed when substituted conjugated diolefins are polymerized. This is the case when isoprene is used.

SUMMARY OF THE INVENTION

Polymerized conjugated dienes having small molecule functional groups have been prepared in a single step using carbon monoxide of a relatively low pressure.

The process of the invention includes reacting polymerized conjugated dienes, which includes styrenic block copolymers, with carbon monoxide and an alcohol in the presence of a cobalt compound and an amine ligand.

The polymers of the invention can be identified as 1,3-butadiene polymers or block copolymers having functionalized, polymerized butadiene units represented by both Equation I and Equation II:

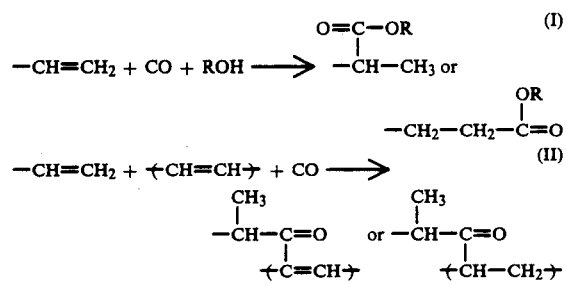

in which the $-CH=CH_2$ pendent vinyl groups represent the 1,2 microstructure of the polymerized butadiene units, the $-(CH=CH)-$ internal unsaturation represents the 1,4 microstructure of the polymerized butadiene units, and R represents a hydrocarbon group having 1 to 20 carbon atoms. According to equation I, a carboxylic ester is formed. In equation II a ketone linking group is formed which probably links a polymerized butadiene unit having 1,4 microstructure, with or without olefinic unsaturation, and an adjacent polymerized butadiene having 1,2 microstructure, but may link different polymer molecules.

The reactions represented by equations I and II can occur at different rates with equation I generally being dominant. However, the relative reaction rates are observed to vary depending on the relative amounts of 1,2 and 1,4 microstructure and on the specific alcohol selected for the reaction.

The polymers of the invention which contain significant amounts of the following structure:

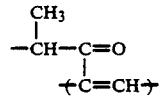

degrade in air under normal conditions. As an alternative to the addition of stabilizers, hydrogenation of these functionalized polymers with a nickel/aluminum catalyst significantly improves the polymer stability by removing the olefinic unsaturation without substantial hydrogenation of the ketone or ester groups.

The polymers of the invention were originally conceived as being prepared with a catalyst composition that included the cobalt compounds. Production of the polymers with catalysts containing other metal compounds such as palladium compounds is possible as demonstrated in U.S. patent application Ser. No. 255,232 filed Oct. 11, 1988, now U.S. Pat. No. 4,927,892.

DETAILED DESCRIPTION OF THE INVENTION

The polymers of the invention can be identified as 1,3-butadiene polymers or block copolymers having functionalized, polymerized butadiene units represented by both Equation I and Equation II:

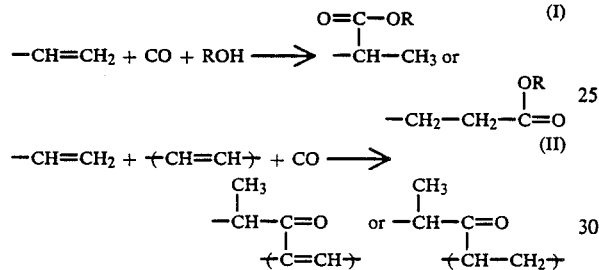

in which the $-CH=CH_2$ pendent vinyl groups represent the 1,2 microstructure of the polymerized butadiene units, the $-CH=CH-$  olefinic unsaturation represents the 1,4 microstructure of the polymerized butadiene units, and R represents a hydrocarbon group having 1 to 20 carbon atoms. According to Equation I, a carboxylic ester is formed. In Equation II a ketone linking group is formed which probably links a polymerized butadiene unit having 1,4 microstructure, with or without olefinic unsaturation, and an adjacent polymerized butadiene having 1,2 microstructure, but may link different polymer molecules. The reactions represented by equations I and II can occur at different rates with equation I generally being dominant. However, the relative reaction rates are observed to vary depending on the relative amounts of 1,2 and 1,4 microstructure and on the specific alcohol selected for the reaction.

The process of the invention includes reacting polymerized conjugated dienes, which includes styrenic block copolymers, with carbon monoxide and an alcohol, in the presence of a cobalt compound and an amine ligand.

The starting polymer is preferably a block copolymer of 1,3-butadiene and a monoalkenylarene, the block copolymer having at least one monoalkenylarene block and at least one polymerized 1,3-butadiene block which includes adjacent 1,2 and 1,4 microstructure. Examples of useful monoalkenylarene compounds are styrene, 2-methylstyrene, and 4-methylstyrene. Examples of other conjugated dienes which may be present in the block copolymer include isoprene and 1,3-pentadiene. The block copolymers may include random or tapered blocks as long as at least one of the blocks contains predominently monoalkenylarene units and at least one of the polymer blocks contains at least predominently conjugated diene units. Very good results have been obtained with essentially homopolymer blocks of styrene and butadiene. When the content of aromatic vinyl compound in the block copolymer is small, the block copolymer is a so-called thermoplastic rubber. Block copolymers with a high aromatic vinyl compound content, such as more than 70% by weight, provide a resin. Many processes are known for the preparation of block copolymers, for example from U.S. Pat. No. 3,639,517.

The reactions represented by Equation I have been acheived with homopolymer blocks of polymerized isoprene. However, the presence of adjacent 1,4 and 1,2 microstructures in the isoprene blocks does not give ketone linking groups as measured by infrared analysis. On the other hand, homopolymer blocks of polymerized butadiene having 10% of the butadiene units with the 1,4 microstructure were functionalized to give significant amounts of the ketone linking groups. Further, homopolymer blocks of butadiene having 90% of the butadiene units with the 1,4 microstructure were functionalized to give more ketone linking groups than ester groups which represented about a ten-fold increase in the amount of ketone linking groups in comparison to the functionalized blocks having 10% of the butadiene units with the 1,4 microstructure.

Preferred block copolymers which may be used as precursors for the polymers of the present invention are described in U.S. Pat. No. Re 27,145 as styrenic block copolymers having a general structure

A—B—A wherein the two terminal polymer blocks A comprise thermoplastic polymer blocks of the monoalkenylarenes, while block B is a conjugated diene block that contains polymerized butadiene units with both the 1,2 and 1,4 microstructures prior to hydrogenation. The proportion of the blocks A to the block B and the relative molecular weights of each of these blocks is balanced to obtain a rubber having an optimum combination of properties such that it behaves as a vulcanized rubber without requiring the actual step of vulcanization. Although hydrogenation may be effected selectively as disclosed in U.S. Pat. No. Re 27,145, the selectively hydrogenated A—B—A block copolymers are deficient in many applications in which adhesion is required due to its hydrocarbon nature. Examples include the toughening and compatibilization of polar polymers such as the engineering thermoplastics, the adhesion to high energy substrates of hydrogenated block copolymer elastomer based adhesives, sealants and coatings, and the use of hydrogenated elastomer in reinforced polymer systems. However, the placement onto the A—B—A block copolymer of functional groups prior to hydrogenation in agreement with the present invention, which groups can provide interactions not possible with hydrocarbon polymers, solves the adhesion problem and extends the range of applicability of this material.

The molecular weight of the conjugated diene polymer is not critical and may vary within wide ranges, for example between 2,000 and 1,000,000. In view of the theoretical equations presented above, it is believed that substantial presence of the ketone linking groups in the functionalized polymers depends on the presence in the butadiene polymer molecule of adjacent butadiene units having 1,2 and 1,4 microstructures as represented by the following theoretical equation:

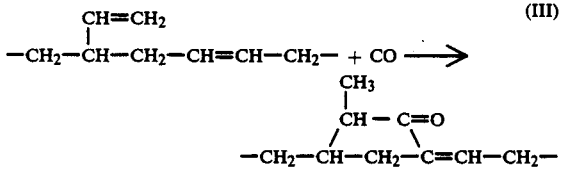

After the reaction is initiated by addition of the carbon monoxide to the 1,2 microstructure, the adjacent 1,4 microstructure appears to compete with the alcohol for formation of either a ketone linking group (Eq. III) or a carboxylic ester group (Eq. I). As shown in Equation II, the olefinic unsaturation in the polymer backbone in Equation III may be removed during the one-step functionalization. Saturation of these olefinic sites may involve capture of the metal catalyst and hydrogen followed by replacement of the metal with hydrogen during polymer workup.

The alcohols used in making the polymers of the present invention may be aliphatic, cycloaliphatic or aromatic and may be substituted with one or more substituents, for example with halogen atoms or cyano, ester, alkoxy, carboxyl or aryl groups. The alcohol may therefore be a phenol. Experiments conducted with methanol and with cyclohexanol indicate that the ratio of ketone linking groups to carboxylic ester groups formed in a given block copolymer depends on the selection of the alcohol. As much as a three-fold decrease in the ratio of ketone linking groups to ester groups has been realized by changing the alcohol from cyclohexanol to methanol. Other suitable alcohols are believed to include ethanol, propanol, 2-propanol, isobutanol, tert.-butyl alcohol, n-hexanol, 2-ethylhexanol, stearyl alcohol, benzyl alcohol, chlorocapryl alcohol, ethylene glycol, 1,2-propanediol, 1,4-butanediol, glycerol, polyethylene glycol, 1,6-hexanediol, phenol and cresol. The alcohol may also be a hydroxyl terminated ethoxylate or other long chain alcohol. If the alcohol has more than one hydroxyl group per molecule, a mono-ester may be formed.

The precurser polymers and alcohol are reacted with carbon monoxide which may be pure or diluted with an inert gas, such as nitrogen, a noble gas or carbon dioxide. The carbon monoxide may also be produced in the reaction mixture on a small scale as known in the art. Generally the presence of more than 10% by volume of hydrogen is undesirable, since under the reaction conditions it may cause hydrogenation of ethylenically unsaturated carbon carbon bonds. Preference is given to the use of carbon monoxide or a carbon monoxide containing gas which contains less than 5% by volume of hydrogen.

The process of the present invention will usually be conducted in the presence of a solvent for the precurser polymer. Examples of such solvents are hydrocarbons such as cyclohexane, hexane, heptane, octane, benzene, toluene, the three xylenes, ethylbenzene and cumene; ethers such as diethyl ether; and tetrahydrofuran (THF). Mixtures of the hydrocarbons and ethers may be used.

The process for making the polymers according to the present invention may be carried out batchwise, semi-continuously or continuously. Catalyst residues are preferably removed from the polymer by extraction into an aqueous acid such as dilute hydrochloric acid or sulfuric acid. Alternatively, the functionalized polymer solution may be purified by chromatography on basic and neutral alumina. Elution of the polymer solution through a combination bed of basic and neutral alumina left the spent catalyst residues in the chromatography column. The catalyst residues have also been removed by coagulation of the polymer in isopropyl alcohol.

Although the process of the present invention may be conducted at temperatures and pressures which may vary within wide ranges, the process temperature is preferably in the range of from 50° C. to 200° C. and the overall pressure is preferably in the range of from 1 to 100 bar.

The process of the present invention may be carried out using a molar ratio of vinyl groups in the conjugated diene hydrocarbon to alcohol which is not critical and may vary within wide ranges. This molar ratio usually lies in the range of from 0.01 to 10.

The process of the present invention is conducted in the presence of a catalyst composition that includes a cobalt compound such as cobalt 2-ethylhexanoate (sometimes known as cobalt octanoate), cobalt acetate, or cobalt carbonyl, and an amine ligand such as pyridine, alkyl substituted pyridines, pyrazine, and n-methyl pyrrole. The quantity of the cobalt compound is not critical. Preference is given to the use of quantities in the range of from 0.001 to 0.1 gram-atom cobalt per mol of 1,2 microstructure in the polymerized conjugated diene.

The process of the present invention may be carried out using a ratio of moles of the amine ligand per gram-atom of cobalt which is not critical and may vary within wide ranges. This ratio is preferably at least 0.1 and in particular in the range of from 1 to 100, thus promoting high reaction rates.

The polymers of the invention can also be made according to the processes described in United States Patent Application No. 255,232 filed Oct. 11, 1988. The use of a palladium catalyst simplifies analysis of the products since cobalt broadens the bandwidths recorded by nuclear magnetic resonance equipment.

The polymers of the invention which contain significant amounts of the following structure:

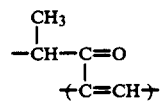

degrade in in air under normal conditions. The polymers may be stabilized with conventional stabilizers if exposure to oxygen is required. The addition of conventional hindered phenolics has been found to improve the polymer stability. Preferably, as an alternative to the addition of stabilizers, hydrogenation of these functionalized polymers with a nickel/aluminum catalyst significantly improves the polymer stability by removing the olefinic unsaturation in the polymer backbone without substantial hydrogenation of the ketone or ester groups.

Derivatives of the ester groups in the described polymers can be prepared using standard reactions such as hydrolysis to acids or the corresponding salts, amidation with amines, or transesterification to form different ester groups.

The following Examples further illustrate the invention using the four styrenic block copolymers identified in Table 1.

TABLE 1

| Polymer Designation | Polymer Type (Block Molecular Weight) | Comments |
|---|---|---|
| A | S-B-S (8,900-37,900-9,700) | 38% 1,2-microstructure |
| A' | S-B-S (7,800-35,000-7,200) | 39% 1,2-microstructure |
| B | S-I-S (11,000-138,000-11,000) | |
| C | S-I (39,000-68,000) | | where S = polystyrene, B = polybutadiene, I = polyisoprene

EXAMPLE 1

Ketone linking groups and carboxylic ester groups were introduced into the butadiene block of Polymer A using the following procedure.

A 5% wt/wt solution of Polymer A (74g) in a mixed cyclohexane (1200 g) and methanol (180g) solvent was loaded into a 1 gal. autoclave. A catalyst charge of cobalt (2+) octanoate in mineral spirits (12% Co(w/w), 9.91g, 20 mmol) and pyridine (4.8g, 61 mmol) was added as a solution in cyclohexane (16g). The well stirred solution was sparged at room temperature with carbon monoxide (900 psig, 1 min) to remove gaseous impurities. The vessel was brought up to reaction pressure (750 psig) by addition of carbon monoxide and sealed. The vessel was heated to 150° C. After 3.5 hr. at these conditions, the reaction was allowed to cool (reaction mixture was allowed to stand overnight, although the solution was at room temperature in about 6 hrs). An aliquot of the product solution was cast into a thin polymer film by evaporation of the solvent. Analysis of the elastomeric film by an Infrared (IR) method found both ester and ketone functionality in the product. Ester functionality was characterized by a signal on 1740 cm$^{-1}$ and ketones were noted at 1700 cm$^{-1}$. A band at 1600 cm$^{-1}$ was attributed to polystyrene and was used as an internal reference signal. The absorbances (A) of these bands were measured using an integration method and compared as follows: $A_{(Ketone)}/A_{(Ester)}=0.40$; $A_{(Ketone)}/A_{(Styrene)}=0.45$; $A_{(Ester)}/A_{(Styrene)}=1.14$. The remainder of the product solution was reserved for hydrogenation studies.

EXAMPLE 2

A repeat of the experiment of Example 1 using substrate A' gave a product having similar functionality. The infrared analysis found $A_{(Ketone)}/A_{(Ester)}=0.35$, $A_{(Ester)}/A_{(Styrene)}=1.72$, and $A_{(Ketone)}/A_{(Styrene)}=0.61$. This product had slightly more functionality than the product described in Example 1.

The product of Example 2 was purified using a chromatography technique. The reaction product solution was acidified (100 ml of 5% w/w conc. HCl in isopropyl alcohol (IPA)) and passed through a column (1.4 in. dia.) of basic alumina (80g, Woelm 200 mesh, Super I Activity) over neutral alumina (150g, same grade). Coagulation in IPA afforded a white polymer crumb with low levels of catalyst residues as determined by elemental analysis (Co- 210 ppm, N- 34 ppm). The combined chromatography—coagulation process was preferred for removal of catalyst residues from the functionalized polymer.

EXAMPLE 3

The procedure of Example 1 was modified by reducing both the catalyst concentration and the reaction time. For this experiment, the catalyst concentration, both cobalt octanoate and pyridine, was reduced 4-fold from that used for Example 1 ([Co]=810 ppm). For this experiment, the [Co]=210 ppm while keeping the Pyridine/Co ratio at 3/1 (mol/mol). The reaction time was 1.5 hr.

Analysis of the product by IR found $A_{(Ketone)}/A_{(Ester)}=0.52$, $A_{(Ester)}/A_{(Styrene)}=0.83$, and $A_{(Ketone)}/A_{(Styrene)}=0.43$. This product contained a lower level of functionality than had been observed in Examples 1 and 2. As suspected, the reduction of catalyst concentration and reaction time reduced the level of functionality in the product.

The product was purified using a liquid-liquid extraction technique. The reaction product solution was contacted with an equal volume mixture of aqueous $H_2SO_4$ (0.5% w/w) containing IPA (10% w/w). The blend was allowed to phase separate and the aqueous phase was discarded. The polymer solution was washed 3 more times and then an aliquot was coagulated in IPA. The resulting white polymer crumb contained less than 270 ppm of Co. The combined extraction coagulation method had removed most of the catalyst residue.

The remainder of the purified reaction product was reserved for hydrogenation and saponification experiments.

EXAMPLE 4

The procedure of Example 1 was modified by reducing the catalyst concentration and increasing the reaction time. For this experiment, the catalyst concentrations, both cobalt and pyridine, were reduced 2-fold from that used in Example 1 ([Co]=810 ppm). For this experiment, the [Co]=400 ppm while keeping the pyridine/Co ratio at 3/1 (mol/mol). The reaction time was 24 hr.

Analysis of the product by IR found $A_{(Ketone)}/A_{(Ester)}=0.39$, $A_{(Ester)}/A_{(Styrene)}=4.47$, and $A_{(Ketone)}/A_{(Styrene)}=1.76$. Clearly, reaction for a longer time afforded a more highly functionalized product in spite of the reduced catalyst concentration.

The product was washed as described in Example 3. An aliquot of the solution was evaporated to dryness. Elemental analysis of the residue found 460 ppm Co and 470 ppm N. The extraction procedure had removed most of the catalyst residues.

EXAMPLE 5

The procedure of Example 1 was modified to employ Polymer B and a reduced catalyst concentration. For this experiment, Polymer B, an SIS polymer, was used instead of Polymer A. The catalyst charge was ½ that used in Example 1 ([Co]=810 ppm). In this example, the [Co]=400 ppm while keeping the pyridine/cobalt ratio at 3/1 (mol/mol). The reaction time was extended to 5 hrs.

Analysis of the product by IR found no ketone functionality with $A_{(Ketone)}/A_{(Ester)}=0$, $A_{(Ester)}/A_{(Styrene)}=0.23$, and $A_{(Ketone)}/A_{(Styrene)}=0$. Changing the diene segment of the block copolymer from butadiene to isoprene had a profound affect upon the mixture of functional species noted in the product. The isoprene based polymer gave a product containing only ester functionality.

EXAMPLE 6

The procedure of Example 1 was modified to use Polymer C and a reduced catalyst concentration. From this experiment, Polymer C, an SI polymer, was used instead of Polymer A. The catalyst charge was 1/4 that used in Example 1 ([Co]=810 ppm). In this example, the [Co]=220 ppm while keeping the pyridine/cobalt ratio at 3/1 (mol/mol).

Analysis of the product by IR found no ketone functionality with $A_{(Ketone)}/A_{(Ester)}=0$, $A_{(Ketone)}/A_{(Styrene)}=0$, and $A_{(Ester)}/A_{(Styrene)}=0.17$. As noted in Example 5, the isoprene based reactant gave a ketone-free product.

The reaction product solution was purified using the chromatography method noted in Example 2. An aliquot of the purified solution was coagulated in IPA affording a white polymer crumb (Co=170 ppm, N=20 ppm).

EXAMPLE 7

A hydrogenation catalyst was prepared under an inert atmosphere by combining slowly with stirring nickel 2-ethyl hexanoate (17.75g of 12% w/w suspension in mineral spirits) in dry cyclohexane (250g) and triethyl aluminum (TEA) (33.3g of 25.3% w/w solution in cyclohexane). The reagents were added slowly to minimize the temperature increase associated with the exothermic reaction. The product solution contained aluminum/nickel at a ratio of 2.3/1 (mol/mol) and was used as made for hydrogenation experiments.

The functionalized, unsaturated polymer used in this study was a ketone-ester modified analog of Polymer A'. It was characterized as follows $A_{(Ketone)}/A_{(Ester)}=0.20$, $A_{(Ketone)}/A_{(Styrene)}=0.31$, and $A_{(Ester)}/A_{(Styrene)}=1.61$. A solution of this polymer in cyclohexane (5% w/w polymer) was hydrogenated in a 1 gal. autoclave using the Ni/Al catalyst solution described above. The solution was sparged with hydrogen to remove impurities. The reactor vent was closed and the well stirred mixture brought to 38° C. and 600 psi of hydrogen. The hydrogenation catalyst was added in three increments (40%, 40%, and 20%) to a final nickel concentration of 250 ppm. After each aliquot of catalyst was added, the reaction temperature was allowed to stabilize (exotherm) before the next increment of catalyst was added. The reaction was maintained at 90° C. for 3 hrs. The hydrogenated product solution was washed repeatedly with equal volumes of aqueous H$_2$SO$_4$ (1% w/w) to remove the spent catalyst. The purified polymer was isolated by coagulation in IPA.

Analysis of the white polymer crumb by ozonolysis found 96.7% of the C=C sites had been hydrogenated; the product was essentially completely saturated. When the IR analysis of Example 1 was applied to this material, there was some inconclusive evidence for partial reduction of ketone groups to hydroxyl groups but no evidence for reduction of ester sites to hydroxyl groups considering that $A_{(Ketone)}/A_{(Ester)}=0.07$, $A_{(Ketone)}/A_{(Styrene)}=0.14$ and $A_{(Ester)}/A_{(Styrene)}=2.1$. The Ni/Al hydrogenation method gave a styrenic block copolymer having principally ketone and ester sites in a saturated butadiene segment.

The starting, unsaturated, functionalized 1,3-butadiene block copolymer had poor stability on exposure to air in comparison to the unsaturated, functionalized isoprene block copolymers. A sample of the starting 1,3.butadiene block copolymer which had been exposed to the atmosphere for 48 hours could not be redissolved. The hydrogenated polymer of the present example was freely soluble in both cyclohexane and tetrahydrofuran (THF) when analyzed after 48 days of exposure to air. Hydrogenation had greatly enhanced the stability of this polymer to exposure to air.

EXAMPLE 8

An aliquot of the purified product solution from Example 3 was coagulated in IPA. The freshly precipitated polymer (5.7g) was immediately redissolved in anhydrous THF (94g). Under an inert atmosphere, this solution was treated, with stirring, with a saponification reagent, potassium trimethylsilanoate (1.4g, 90% technical grade Aldrich Chemical Co., 0.01 mol). After 22 hr., an aliquot of the product was cast into a thin polymer film and analyzed by IR. The product was characterized by a loss in ester sites(substantial reduction in the band at 1740 cm$^{-1}$) and the formation of an acid salt, —CO$_2$K (a new, broad signal located between 1550 and 1610 cm$^{-1}$). The saponification technique had afforded a styrenic block copolymer having ketone and acid salt functionality distributed in the butadiene block of the block copolymer.

The preceding examples are illustrative of preferred embodiments of the invention and do not limit the following claims to the products or processes described therein.

What is claimed is:

1. A functionalized polymer comprising polymerized 1,3-butadiene units and both carboxylic ester groups and ketone linking groups.

2. The polymer of claim 1 wherein the polymerized 1,3-butadiene units are present as at least one butadiene block in a block copolymer that contains at least one monoalkenylarene block.

3. The polymer of claim 2 wherein the monoalkenylarene block predominently comprises non-functionalized polystyrene.

4. The polymer of claim 1 wherein the ketone linking groups include the following structure

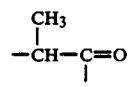

and the ester groups include either of the following structures

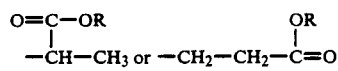

wherein R represents a hydrocarbon group having 1 to 20 carbon atoms.

5. The polymer of claim 4 wherein the ketone linking groups complete either of the following structures

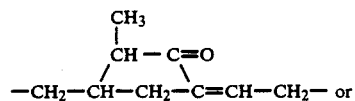

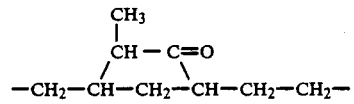

in combination with the polymerized 1,3-butadiene units.

6. The polymer of claim 4 wherein R is a methyl group.

7. The block copolymer of claim 5 wherein substantially all of the polymerized 1,3-butadiene units do not have olefinically unsaturated carbon-carbon bonds.

8. A functionalized block copolymer comprising:
at least two monoalkenylarene blocks; and
at least one functionalized conjugated diene block positioned between two monoalkenylarene blocks, the conjugated diene block having polymerized 1,3-butadiene units and both ketone linking groups and ester groups, the ketone linking groups having the following structure

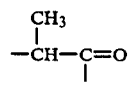

and the ester groups having either of the following structures

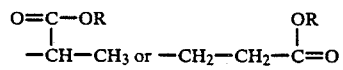

wherein R represents a hydrocarbon group having 1 to 20 carbon atoms.

9. The block copolymer of claim 8 wherein the conjugated diene block predominently comprises polymerized 1,3-butadiene.

10. The block copolymer of claim 8 wherein the monoalkenylarene block predominently comprises non-functionalized polystyrene.

11. The block copolymer of claim 8 wherein the ketone linking groups complete either of the following structures

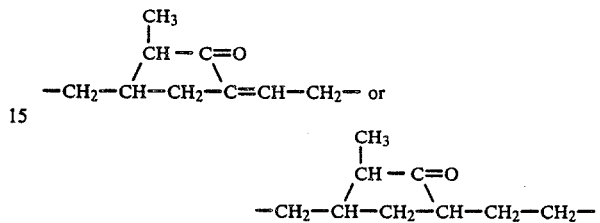

in combination with the polymerized 1,3-butadiene units.

12. The block copolymer of claim 8 wherein R is a methyl group.

13. The block copolymer of claim 8 wherein substantially all of the polymerized 1,3-butadiene units do not have olefinically unsaturated carbon-carbon bonds.

* * * * *